(12) United States Patent
Fu (10) Patent No.: US 9,989,732 B1
(45) Date of Patent: Jun. 5, 2018

(54) LENS ASSEMBLY

(71) Applicants: Sintai Optical (Shenzhen) Co., Ltd., ShenZhen, Guangdong Province (CN); Asia Optical Co., Inc., Taichung (TW)

(72) Inventor: Tao Fu, ShenZhen (CN)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days. days.

(21) Appl. No.: 15/600,871

(22) Filed: May 22, 2017

(51) Int. Cl.
- G02B 9/06 (2006.01)
- G02B 9/64 (2006.01)
- G02B 1/04 (2006.01)
- G02B 1/00 (2006.01)
- G02B 13/00 (2006.01)
- G02B 27/00 (2006.01)

(52) U.S. Cl.
CPC .............. G02B 9/64 (2013.01); G02B 1/007 (2013.01); G02B 1/041 (2013.01); G02B 13/006 (2013.01); G02B 13/0045 (2013.01); G02B 27/0012 (2013.01); G02B 27/0025 (2013.01)

(58) Field of Classification Search
CPC ........................................................ G02B 9/64
USPC ........................................................... 359/754
See application file for complete search history.

(56) References Cited

U.S. PATENT DOCUMENTS

2009/0303608 A1* 12/2009 Schauss ................ 359/674
2015/0070786 A1 3/2015 Chou et al.

* cited by examiner

*Primary Examiner* — James Jones
(74) *Attorney, Agent, or Firm* — McClure, Qualey & Rodack, LLP (57) ABSTRACT

A lens assembly includes sequentially from an object side to an image side along an optical axis a first lens, a second lens, a third lens, a fourth lens, a stop, a fifth lens, a sixth lens, a seventh lens and an eighth lens. The first lens is a meniscus lens with refractive power. The second lens is a meniscus lens with refractive power. The third lens is a biconcave lens with negative refractive power. The fourth lens is a biconvex lens with positive refractive power. The fifth lens is a biconvex lens with positive refractive power. The sixth lens is with positive refractive power. The seventh lens is with negative refractive power. The eighth lens is with positive refractive power. The sixth lens and the seventh lens are cemented together.

19 Claims, 8 Drawing Sheets

LENS ASSEMBLY

CROSS-REFERENCE TO RELATED APPLICATIONS

This Application claims priority of China Patent Application No. 201611205833.7 filed on Dec. 23, 2016, the entirety of which is incorporated by reference herein.

BACKGROUND OF THE INVENTION

Field of the Invention

The invention relates to a lens assembly.

Description of the Related Art

Nowadays, the total lens length and diameter are large for a lens assembly with field of view of more than 200 degrees. It is difficult to meet the requirements of miniaturization. Therefore, the lens assembly needs a new structure in order to meet the requirements of wide field of view, small F-number and miniaturization.

BRIEF SUMMARY OF THE INVENTION

The invention provides a lens assembly to solve the above problems. The lens assembly of the invention is provided with characteristics of a shortened total lens length, a wider field of view, a decreased F-number, and still has a good optical performance.

The lens assembly in accordance with an exemplary embodiment of the invention includes a first lens, a second lens, a third lens, a fourth lens, a stop, a fifth lens, a sixth lens, a seventh lens and an eighth lens, all of which are arranged in order from an object side to an image side along an optical axis. The first lens is a meniscus lens with refractive power. The second lens is a meniscus lens with refractive power. The third lens is a biconcave lens with negative refractive power. The fourth lens is a biconvex lens with positive refractive power. The fifth lens is a biconvex lens with positive refractive power. The sixth lens is with positive refractive power. The seventh lens is with negative refractive power. The eighth lens is with positive refractive power. The sixth lens and the seventh lens are cemented together.

The first lens is with negative refractive power, and the second lens is with negative refractive power.

The lens assembly satisfies: $-15<f_1/f<-1.8$, wherein $f_1$ is an effective focal length of the first lens and f is an effective focal length of the lens assembly.

The lens assembly satisfies: $-15<f_2/f<-1.8$, wherein $f_2$ is an effective focal length of the second lens and f is an effective focal length of the lens assembly.

The lens assembly satisfies: $-15<f_3/f<-1.8$, wherein $f_3$ is an effective focal length of the third lens and f is an effective focal length of the lens assembly.

The lens assembly satisfies: $-0.8<f_{123}/f<-0.6$, wherein $f_{123}$ is an effective focal length of a combination of the first lens, the second lens and the third lens, and f is an effective focal length of the lens assembly.

The lens assembly satisfies: $2.4<f_8/f<2.8$, wherein $f_8$ is an effective focal length of the eighth lens and f is an effective focal length of the lens assembly.

The lens assembly satisfies: $-0.8<f_{1234}/f_{5678}<-0.6$, wherein $f_{1234}$ is an effective focal length of a combination of the first lens, the second lens, the third lens and the fourth lens, and $f_{5678}$ is an effective focal length of a combination of the fifth lens, the sixth lens, the seventh lens and the eighth lens.

The lens assembly satisfies: $0.8<TTL/D_1<1.6$, wherein TTL is an interval from an object surface of the first lens to an image plane along the optical axis and $D_1$ is an effective diameter of the first lens.

The lens assembly satisfies: $200°<FOV<240°$, wherein FOV is a maximum field of view in degree for the lens assembly.

The first lens further comprises a convex surface facing the object side and a concave surface facing the image side.

The second lens further comprises a convex surface facing the object side and a concave surface facing the image side.

The third lens is a spherical lens.

The second lens further includes two surfaces, at least one of which is an aspheric surface, the third lens further includes two surfaces, at least one of which is an aspheric surface, the fifth lens further includes two surfaces, at least one of which is an aspheric surface, and the eighth lens further includes two surfaces, at least one of which is an aspheric surface.

The first lens, the second lens, the third lens, the fourth lens, the fifth lens, the sixth lens, the seventh lens and the eighth lens are made of glass material.

The lens assembly in accordance with an exemplary embodiment of the invention includes a first lens, a second lens, a third lens, a fourth lens, a fifth lens, a sixth lens, a seventh lens and an eighth lens, all of which are arranged in order from an object side to an image side along an optical axis. The first lens is with negative refractive power. The second lens is with negative refractive power. The third lens is a biconcave lens with negative refractive power. The fourth lens is a biconvex lens with positive refractive power. The fifth lens is a biconvex lens with positive refractive power. The sixth lens is with positive refractive power. The seventh lens is with negative refractive power. The eighth lens is with positive refractive power. The lens assembly satisfies: $-15<f_1/f<f_2/f<f_3/f<-1.8$, wherein $f_1$ is an effective focal length of the first lens, $f_2$ is an effective focal length of the second lens, $f_3$ is an effective focal length of the third lens and f is an effective focal length of the lens assembly.

The lens assembly further comprises a stop disposed between the fourth lens and the fifth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
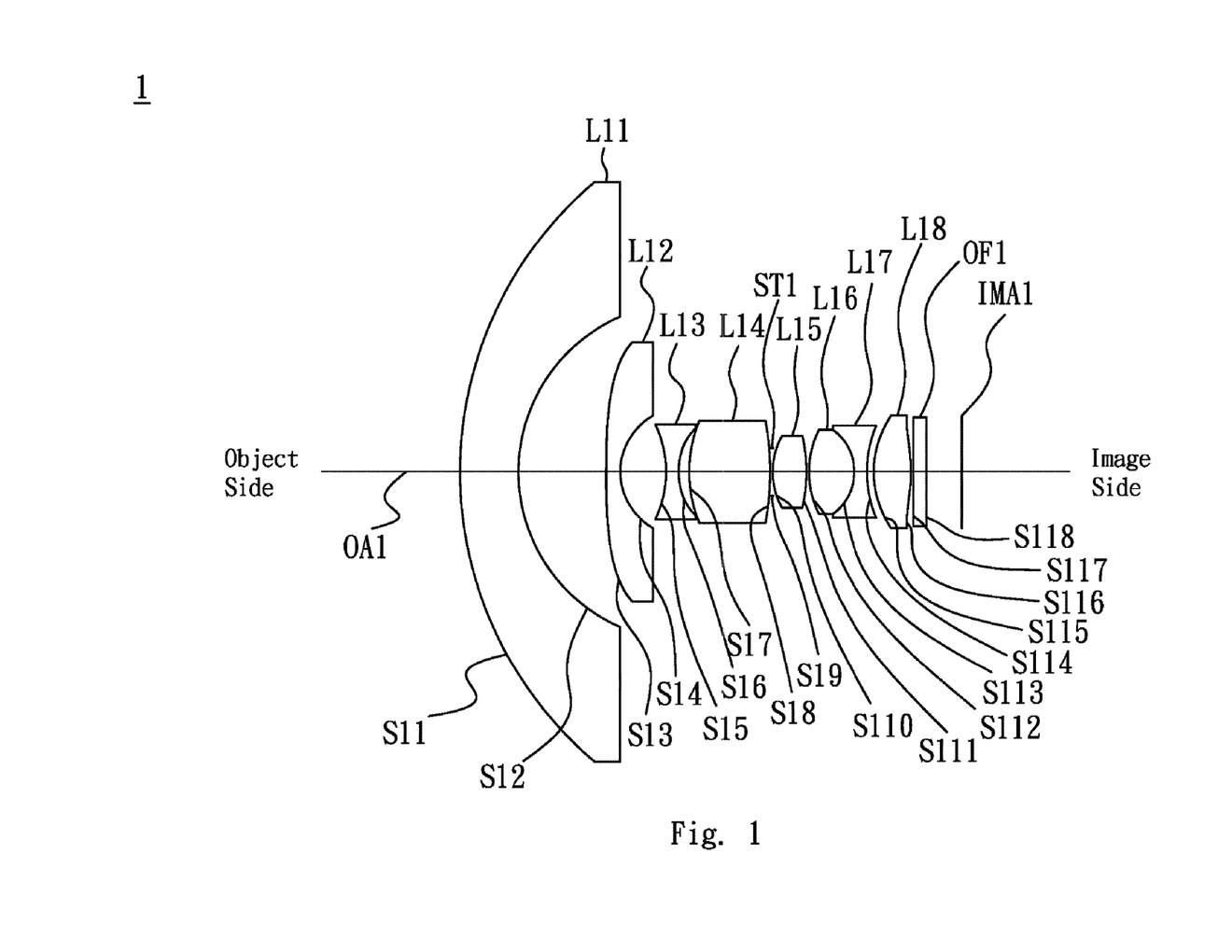
FIG. 1 is a lens layout diagram of a lens assembly in accordance with a first embodiment of the invention.

Referring to FIG. 1, FIG. 1 is a lens layout diagram of a lens assembly in accordance with a first embodiment of the invention. The lens assembly 1 includes a first lens L11, a second lens L12, a third lens L13, a fourth lens L14, a stop ST1, a fifth lens L15, a sixth lens L16, a seventh lens L17, an eighth lens L18 and an optical filter OF1, all of which are arranged in order from an object side to an image side along an optical axis OA1. In operation, an image of light rays from the object side is formed at an image plane IMA1.

The first lens L11 is a meniscus lens with negative refractive power and made of glass material, wherein the object side surface S11 is a convex surface, the image side surface S12 is a concave surface and both of the object side surface S11 and image side surface S12 are spherical surfaces.

The second lens L12 is a meniscus lens with negative refractive power and made of glass material, wherein the object side surface S13 is a convex surface, the image side surface S14 is a concave surface and both of the object side surface S13 and image side surface S14 are aspheric surfaces.

The third lens L13 is a biconcave lens with negative refractive power and made of glass material, wherein the object side surface S15 is a concave surface, the image side surface S16 is a concave surface and both of the object side surface S15 and image side surface S16 are aspheric surfaces.

The fourth lens L14 is a biconvex lens with positive refractive power and made of glass material, wherein the object side surface S17 is a convex surface, the image side surface S18 is a convex surface and both of the object side surface S17 and image side surface S18 are spherical surfaces.

The fifth lens L15 is a biconvex lens with positive refractive power and made of glass material, wherein the object side surface S110 is a convex surface, the image side surface S111 is a convex surface and both of the object side surface S110 and image side surface S111 are aspheric surfaces.

The sixth lens L16 is a biconvex lens with positive refractive power and made of glass material, wherein the object side surface S112 is a convex surface, the image side surface S113 is a convex surface and both of the object side surface S112 and image side surface S113 are spherical surfaces.

The seventh lens L17 is a biconcave lens with negative refractive power and made of glass material, wherein the object side surface S113 is a concave surface, the image side surface S114 is a concave surface and both of the object side surface S113 and image side surface S114 are spherical surfaces.

The sixth lens L16 and the seventh lens L17 are cemented together. That is, the air gap is not provided between the sixth lens L16 and the seventh lens L17.

The eighth lens L18 is a biconvex lens with positive refractive power and made of glass material, wherein the object side surface S115 is a convex surface, the image side surface S116 is a convex surface and both of the object side surface S115 and image side surface S116 are aspheric surfaces.

Both of the object side surface S117 and image side surface S118 of the optical filter OF1 are plane surfaces.

In order to maintain excellent optical performance of the lens assembly in accordance with the first embodiment of the invention, the lens assembly 1 satisfies at least one of the following conditions:

$$-15 < f1_1/f1 < f1_2/f1 < f1_3/f1 < -1.8 \tag{1}$$

$$-0.8 < f1_{123}/f1 < -0.6 \tag{2}$$

$$2.4 < f1_8/f1 < 2.8 \tag{3}$$

$$-0.8 < f1_{1234}/f1_{5678} < -0.6 \tag{4}$$

$$0.8 < TTL1/D1_1 < 1.6 \tag{5}$$

$$200° < FOV1 < 240° \tag{6}$$

wherein $f1_1$ is an effective focal length of the first lens L11, $f1_2$ is an effective focal length of the second lens L12, $f1_3$ is an effective focal length of the third lens L13, f1 is an effective focal length of the lens assembly 1, $f1_{123}$ is an effective focal length of a combination of the first lens L11, the second lens L12 and the third lens L13, $f1_8$ is an effective focal length of the eighth lens L18, $f1_{1234}$ is an effective focal length of a combination of the first lens L11, the second lens L12, the third lens L13 and the fourth lens L14, $f1_{5678}$ is an effective focal length of a combination of the fifth lens L15, the sixth lens L16, the seventh lens L17 and the eighth lens L18, TTL1 is an interval from the object surface S11 of the first lens L11 to the image plane IMA1 along the optical axis OA', $D1_1$ is an effective diameter of the first lens L11 and FOV1 is a maximum field of view in degree for the lens assembly 1.

Since f1 is a positive value, so that $f1_3 > f1_2 > f1_1$ can be deduced from condition (1). The condition (1) can also be expressed as $-15 < f1_1/f1 < -1.8$, $-15 < f1_2/f1 < -1.8$, $-15 < f1_3/f1 < -1.8$.

By the above design of the lenses and stop ST1, the lens assembly 1 is provided with an increased field of view, a decreased F-number, a shortened total lens length and an effective corrected aberration.

In order to achieve the above purposes and effectively enhance the optical performance, the lens assembly 1 in accordance with the first embodiment of the invention is provided with the optical specifications shown in Table 1, which include the effective focal length, F-number, total lens length, radius of curvature of each lens surface, thickness between adjacent surface, refractive index of each lens and Abbe number of each lens. Table 1 shows that the effective focal length is equal to 1.26 mm, F-number is equal to 2.4, total lens length is equal to 19.5 mm and maximum field of view is equal to 235 degrees for the lens assembly 1 of the first embodiment of the invention.

TABLE 1

Effective Focal Length = 1.26 mm F-number = 2.4
Total Lens Length = 19.5 mm Maximum Field of View = 235 Degrees

| Surface Number | Radius of Curvature (mm) | Thickness (mm) | Nd | Vd | Remark |
|---|---|---|---|---|---|
| S11 | 14.840 | 2.270 | 1.95 | 18.0 | The First Lens L11 |
| S12 | 6.610 | 3.400 | | | |
| S13 | 40.018 | 0.550 | 1.59 | 61.2 | The Second Lens L12 |
| S14 | 2.366 | 1.790 | | | |
| S15 | −3.910 | 0.500 | 1.62 | 63.7 | The Third Lens L13 |
| S16 | 3.265 | 0.390 | | | |
| S17 | 5.100 | 3.150 | 1.85 | 23.8 | The Fourth Lens L14 |
| S18 | −11.870 | 0.080 | | | |
| S19 | ∞ | 0.020 | 1.866 | | Stop ST1 |
| S110 | 3.165 | 1.310 | 1.50 | 81.1 | The Fifth Lens L15 |
| S111 | −4.954 | 0.100 | | | |
| S112 | 3.720 | 1.760 | 1.50 | 81.6 | The Sixth Lens L16 |
| S113 | −2.050 | 0.500 | 1.85 | 23.8 | The Seventh Lens L17 |
| S114 | 4.620 | 0.280 | | | |
| S115 | 3.667 | 1.430 | 1.80 | 40.9 | The Eighth Lens L18 |
| S116 | −7.154 | 0.100 | | | |
| S117 | ∞ | 0.500 | 1.52 | 64.2 | Optical Filter OF1 |
| S118 | ∞ | 1.377 | | | |

The aspheric surface sag z of each lens in table 1 can be calculated by the following formula:

$$z = ch^2 / \{1 + [1 - (k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C | D | E | F | G |
|---|---|---|---|---|---|---|---|---|
| S13 | −78.023 | 3.72E−04 | 7.56E−05 | −8.14E−07 | −2.17E−07 | 6.60E−09 | 1.53E−10 | −5.31E−12 |
| S14 | −0.262 | −3.53E−03 | 9.32E−04 | −7.58E−05 | −8.15E−05 | 2.18E−05 | 1.68E−06 | −4.53E−07 |
| S15 | −0.700 | 1.11E−03 | 4.46E−04 | 5.64E−05 | 7.57E−07 | −2.30E−06 | −3.35E−07 | 0.00E+00 |
| S16 | 0.864 | 1.38E−02 | −4.55E−04 | 1.13E−03 | −3.41E−04 | 3.12E−05 | −3.49E−06 | 0.00E+00 |
| S110 | 0.665 | 2.50E−03 | −1.30E−03 | 3.22E−03 | −1.79E−03 | 4.83E−04 | −7.32E−05 | 0.00E+00 |
| S111 | −11.248 | −3.32E−03 | 1.04E−03 | 1.33E−03 | −3.34E−04 | 6.45E−04 | −2.58E−04 | 0.00E+00 |
| S115 | 0.246 | −9.70E−03 | 1.87E−03 | −1.83E−04 | 2.87E−05 | −9.54E−06 | 1.26E−06 | −5.63E−08 |
| S116 | −3.296 | 2.32E−03 | 8.48E−04 | 1.19E−04 | 3.19E−05 | −1.27E−05 | 3.16E−07 | 5.62E−08 |

For the lens assembly 1 of the first embodiment, the effective focal length f1 is equal to 1.26 mm, the effective focal length $f1_1$ of the first lens L11 is equal to −14.38 mm, the effective focal length $f1_2$ of the second lens L12 is equal to −4.27 mm, the effective focal length $f1_3$ of the third lens L13 is equal to −2.79 mm, the effective focal length $f1_8$ of the eighth lens L18 is equal to 3.19 mm, the effective focal length $f1_{123}$ of the combination of the first lens L11, the second lens L12 and the third lens L13 is equal to −0.98 mm, the effective focal length $f1_{1234}$ of the combination of the first lens L11, the second lens L12, the third lens L13 and the fourth lens L14 is equal to −2.74 mm, the effective focal length $f1_{5678}$ of the combination of the fifth lens L15, the sixth lens L16, the seventh lens L17 and the eighth lens L18 is equal to 3.47 mm, the interval TTL1 from the object side surface S11 of the first lens L11 to the image plane IMA1 along the optical axis OA1 is equal to 19.5 mm, the effective diameter $D1_1$ of the first lens L11 is equal to 22.6 mm and the maximum field of view FOV1 for the lens assembly 1 is equal to 235 degrees. According to the above data, the following values can be obtained:

$f1_1/f1 = -11.41$, $f1_2/f1 = -3.39$, $f1_3/f1 = -2.21$, $f1_{123}/f1 = -0.78$, $f1_8/f1 = 2.53$, $f1_{1234}/f1_{5678} = -0.789$, $TTL1/D1_1 = 0.86$,

FOV1 = 235 Degrees which respectively satisfy the above conditions (1)-(6).

Figure 2A:
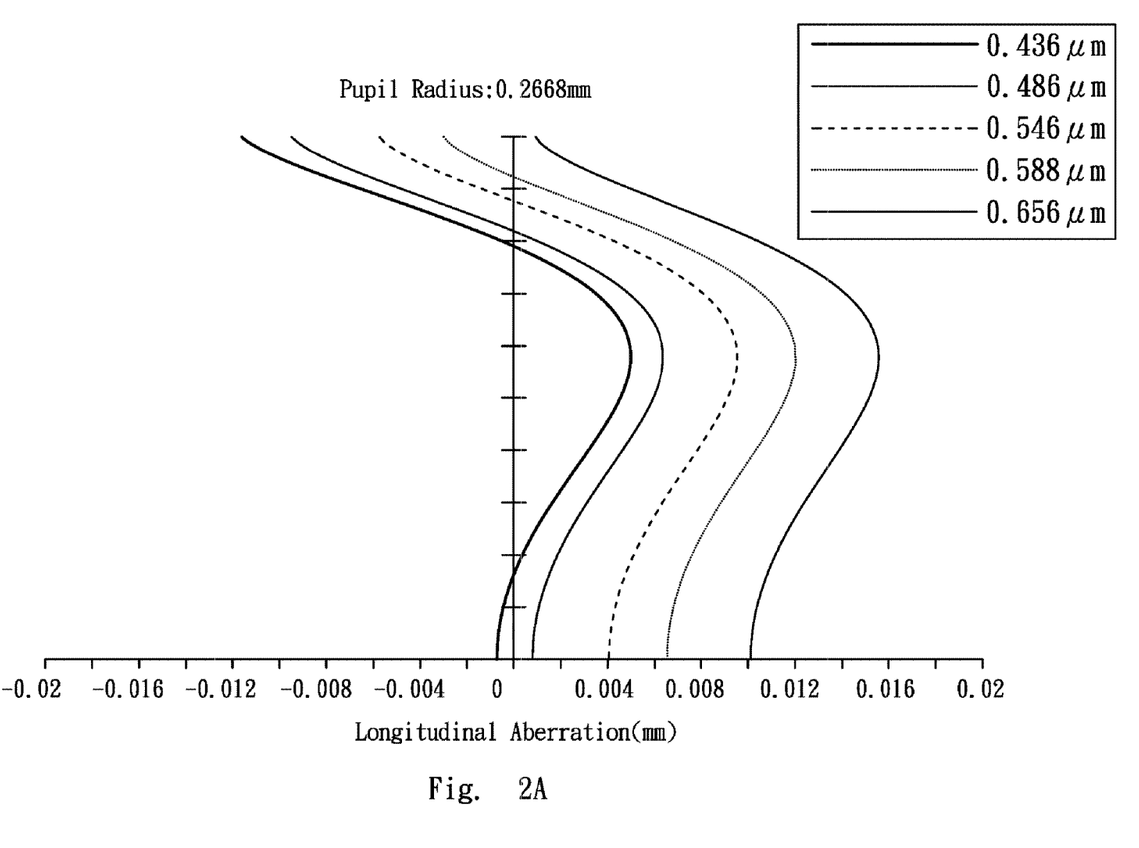
FIG. 2A depicts a longitudinal aberration diagram of the lens assembly in accordance with the first embodiment of the invention.
Figure 2B:
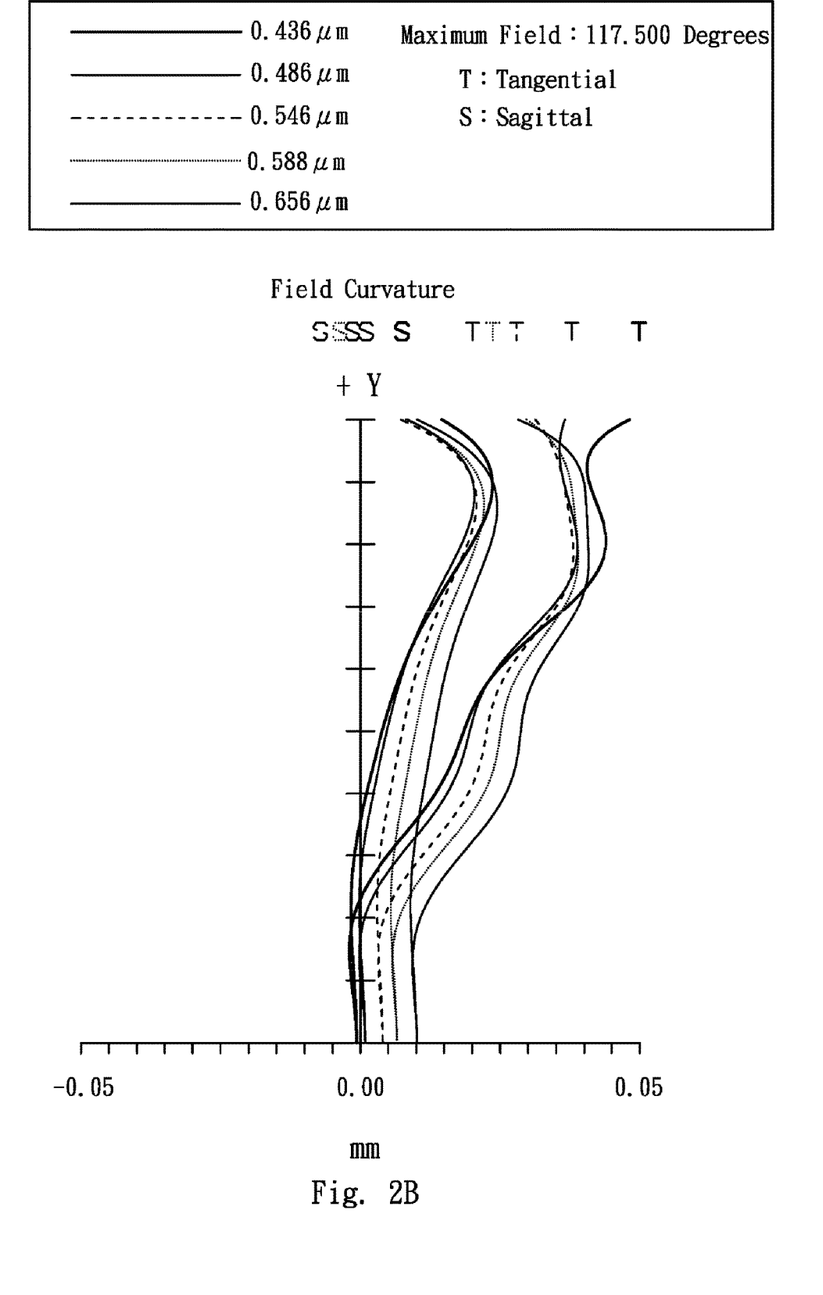
FIG. 2B is a field curvature diagram of the lens assembly in accordance with the first embodiment of the invention.
Figure 2C:
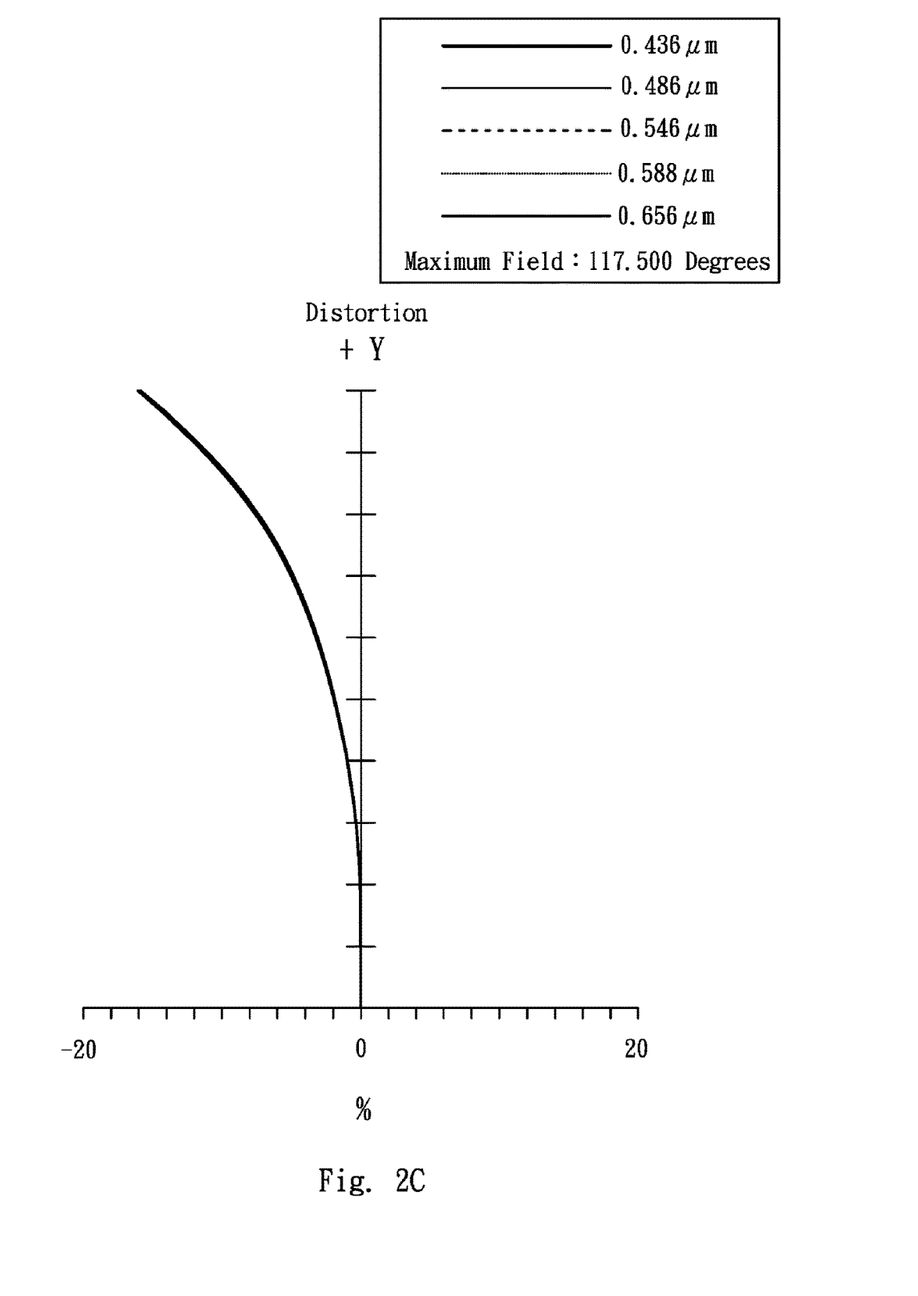
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a longitudinal aberration diagram of the lens assembly 1 in accordance with the first embodiment of the invention, FIG. 2B shows a field curvature diagram of the lens assembly 1 in accordance with the first embodiment of the invention and FIG. 2C shows a distortion diagram of the lens assembly 1 in accordance with the first embodiment of the invention.

It can be seen from FIG. 2A that the longitudinal aberration in the lens assembly 1 of the first embodiment ranges from −0.0012 mm to 0.016 mm for the wavelength of 0.436 μm, 0.486 μm, 0.546 μm, 0.588 μm and 0.656 μm.

It can be seen from FIG. 2B that the field curvature of tangential direction and sagittal direction in the lens assembly 1 of the first embodiment ranges from −0.005 mm to 0.05 mm for the wavelength of 0.436 μm, 0.486 μm, 0.546 μm, 0.588 μm and 0.656 μm.

It can be seen from FIG. 2C (in which the five lines in the figure almost coincide to appear as if a signal line) that the distortion in the lens assembly 1 of the first embodiment ranges from −16% to 0% for the wavelength of 0.436 μm, 0.486 μm, 0.546 μm, 0.588 μm and 0.656 μm.

It is obvious that the longitudinal aberration, the field curvature and the distortion of the lens assembly 1 of the first embodiment can be corrected effectively. Therefore, the lens assembly 1 of the first embodiment is capable of good optical performance.

Figure 3:
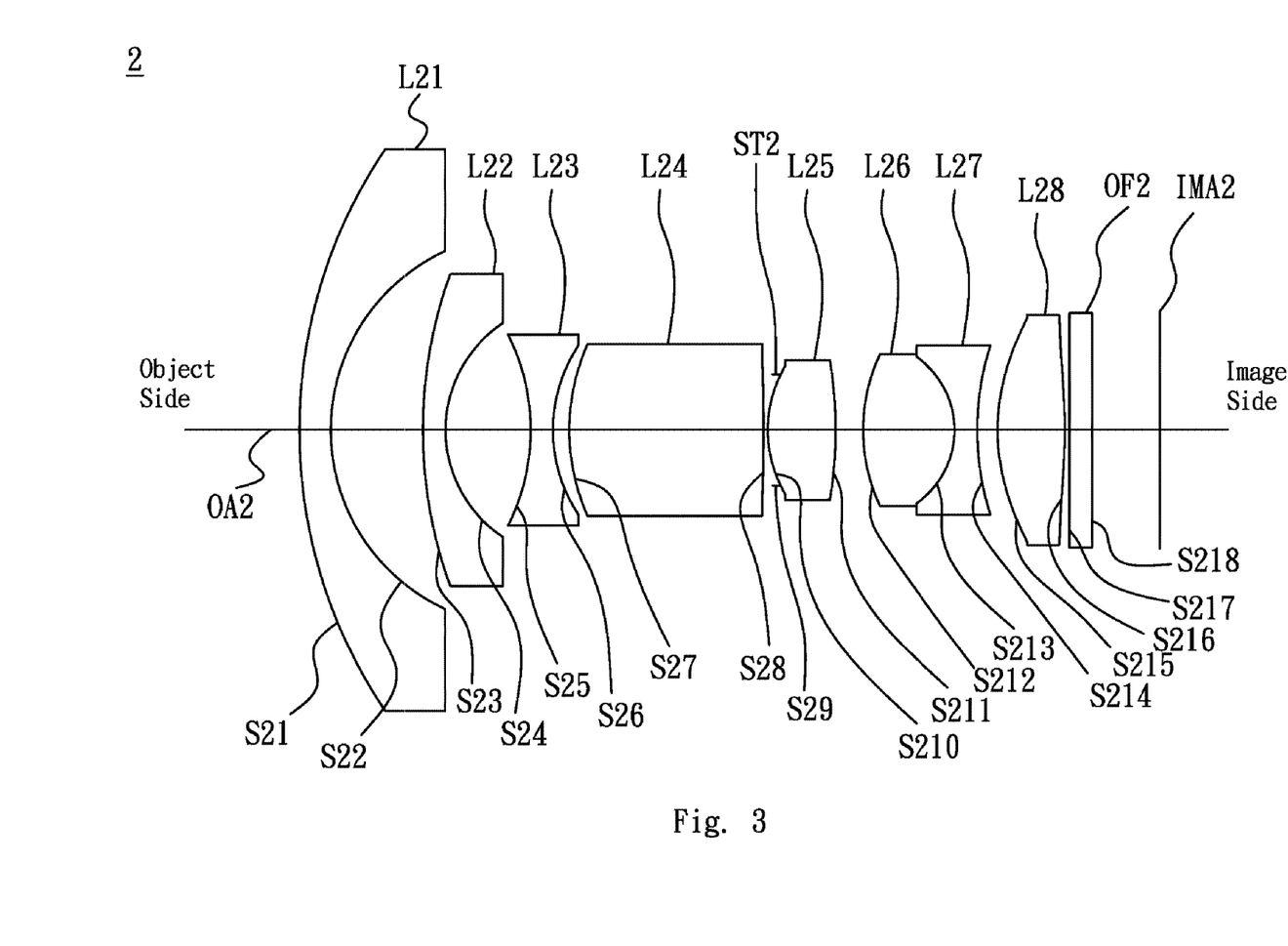
FIG. 3 is a lens layout diagram of a lens assembly in accordance with a second embodiment of the invention.

Referring to FIG. 3, FIG. 3 is a lens layout diagram of a lens assembly in accordance with a second embodiment of the invention. The lens assembly 2 includes a first lens L21, a second lens L22, a third lens L23, a fourth lens L24, a stop ST2, a fifth lens L25, a sixth lens L26, a seventh lens L27, an eighth lens L28 and an optical filter OF2, all of which are arranged in order from an object side to an image side along an optical axis OA2. In operation, an image of light rays from the object side is formed at an image plane IMA2.

The first lens L21 is a meniscus lens with negative refractive power and made of glass material, wherein the object side surface S21 is a convex surface, the image side surface S22 is a concave surface and both of the object side surface S21 and image side surface S22 are spherical surfaces.

The second lens L22 is a meniscus lens with negative refractive power and made of glass material, wherein the object side surface S23 is a convex surface, the image side surface S24 is a concave surface and both of the object side surface S23 and image side surface S24 are aspheric surfaces.

The third lens L23 is a biconcave lens with negative refractive power and made of glass material, wherein the object side surface S25 is a concave surface, the image side surface S26 is a concave surface and both of the object side surface S25 and image side surface S26 are aspheric surfaces.

The fourth lens L24 is a biconvex lens with positive refractive power and made of glass material, wherein the object side surface S27 is a convex surface, the image side surface S28 is a convex surface and both of the object side surface S27 and image side surface S28 are spherical surfaces.

The fifth lens L25 is a biconvex lens with positive refractive power and made of glass material, wherein the object side surface S210 is a convex surface, the image side surface S211 is a convex surface and both of the object side surface S210 and image side surface S211 are aspheric surfaces.

The sixth lens L26 is a biconvex lens with positive refractive power and made of glass material, wherein the object side surface S212 is a convex surface, the image side surface S213 is a convex surface and both of the object side surface S212 and image side surface S213 are spherical surfaces.

The seventh lens L27 is a biconcave lens with negative refractive power and made of glass material, wherein the object side surface S213 is a concave surface, the image side surface S214 is a concave surface and both of the object side surface S213 and image side surface S214 are spherical surfaces.

The sixth lens L26 and the seventh lens L27 are cemented together. That is, the air gap is not provided between the sixth lens L26 and the seventh lens L27.

The eighth lens L28 is a biconvex lens with positive refractive power and made of glass material, wherein the object side surface S215 is a convex surface, the image side surface S216 is a convex surface and both of the object side surface S215 and image side surface S216 are aspheric surfaces.

Both of the object side surface S217 and image side surface S218 of the optical filter OF2 are plane surfaces.

In order to maintain excellent optical performance of the lens assembly in accordance with the second embodiment of the invention, the lens assembly 2 satisfies at least one of the following conditions:

$$-15 < f2_1/f2 < f2_2/f2 < f2_3/f2 < -1.8 \quad (7)$$

$$-0.8 < f2_{123}/f2 < -0.6 \quad (8)$$

$$2.4 < f2_8/f2 < 2.8 \quad (9)$$

$$-0.8 < f2_{1234}/f2_{5678} < -0.6 \quad (10)$$

$$0.8 < TTL2/D2_1 < 1.6 \quad (11)$$

$$200° < FOV2 < 240° \quad (12)$$

The definition of f2, $f2_1$, $f2_2$, $f2_3$, $f2_8$, $f2_{123}$, $f2_{1234}$, $f2_{5678}$, TTL2, $D2_1$ and FOV2 are the same as that of f1, $f1_1$, $f1_2$, $f1_3$, $f1_8$, $f1_{123}$, $f1_{1234}$, $f1_{5678}$, TTL1, $D1_1$ and FOV1 in the first embodiment, and is not described here again.

Since f2 is a positive value, so that $f2_3 > f2_2 > f2_1$ can be deduced from condition (7). The condition (7) can also be expressed as $-15 < f2_1/f2 < -1.8$, $-15 < f2_2/f2 < -1.8$, $-15 < f2_3/f2 < -1.8$.

By the above design of the lenses and stop ST2, the lens assembly 2 is provided with an increased field of view, a decreased F-number, a shortened total lens length and an effective corrected aberration.

In order to achieve the above purposes and effectively enhance the optical performance, the lens assembly 2 in accordance with the second embodiment of the invention is provided with the optical specifications shown in Table 3, which include the effective focal length, F-number, total lens length, radius of curvature of each lens surface, thickness between adjacent surface, refractive index of each lens and Abbe number of each lens. Table 3 shows that the effective focal length is equal to 1.63 mm, F-number is equal to 2.4, total lens length is equal to 19.0 mm and maximum field of view is equal to 207 degrees for the lens assembly 2 of the second embodiment of the invention.

TABLE 3

Effective Focal Length = 1.63 mm F-number = 2.4
Total Lens Length = 19.0 mm Maximum Field of View = 207 Degrees

| Surface Number | Radius of Curvature (mm) | Thickness (mm) | Nd | Vd | Remark |
|---|---|---|---|---|---|
| S21 | 11.240 | 0.690 | 1.95 | 18.0 | The First Lens L21 |
| S22 | 4.390 | 2.030 | | | |
| S23 | 8.269 | 0.500 | 1.59 | 61.2 | The Second Lens L22 |
| S24 | 2.708 | 1.880 | | | |
| S25 | -4.830 | 0.500 | 1.62 | 63.7 | The Third Lens L23 |
| S26 | 3.440 | 0.370 | | | |
| S27 | 4.890 | 4.290 | 1.85 | 23.8 | The Fourth Lens L24 |
| S28 | -28.190 | 0.260 | | | |
| S29 | ∞ | -0.180 | 2.743 | | Stop ST2 |
| S210 | 2.782 | 1.500 | 1.50 | 81.1 | The Fifth Lens L25 |
| S211 | -7.336 | 0.600 | | | |
| S212 | 3.950 | 2.030 | 1.49 | 70.4 | The Sixth Lens L26 |
| S213 | -2.000 | 0.500 | 1.85 | 23.8 | The Seventh Lens L27 |
| S214 | 6.200 | 0.450 | | | |
| S215 | 4.515 | 1.480 | 1.81 | 40.9 | The Eighth Lens L28 |
| S216 | -12.695 | 0.100 | | | |
| S217 | ∞ | 0.500 | 1.52 | 64.2 | Optical Filter OF2 |
| S218 | ∞ | 1.504 | | | |

The aspheric surface sag z of each lens in table 3 can be calculated by the following formula:

$$z = ch^2/\{1[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| Surface Number | k | A | B | C | D | E | F | G |
|---|---|---|---|---|---|---|---|---|
| S23 | 0.763 | −2.85E−03 | 6.60E−05 | 1.67E−05 | −1.15E−06 | 5.80E−09 | 8.53E−10 | 0.00E+00 |
| S24 | −0.401 | −1.74E−03 | −1.58E−04 | 4.93E−04 | −1.45E−04 | 7.95E−06 | 4.13E−06 | −4.97E−07 |
| S210 | 0.130 | −3.31E−03 | 6.30E−04 | −4.04E−04 | 2.03E−04 | −3.68E−05 | −1.89E−06 | 0.00E+00 |
| S211 | −18.852 | −1.15E−03 | 2.14E−03 | −8.72E−04 | 4.48E−04 | −9.17E−05 | 5.75E−06 | 0.00E+00 |
| S215 | 0.483 | −4.39E−03 | 6.75E−04 | −2.18E−04 | 5.59E−05 | −9.16E−06 | 6.79E−07 | −1.81E−08 |
| S216 | −8.085 | 3.59E−03 | −2.25E−04 | 2.53E−05 | 2.09E−05 | −5.92E−06 | 3.94E−07 | −2.76E−09 |

For the lens assembly 2 of the second embodiment, the effective focal length f2 is equal to 1.63 mm, the effective focal length $f2_1$ of the first lens L21 is equal to −7.91 mm, the effective focal length $f2_2$ of the second lens L22 is equal to −7.04 mm, the effective focal length $f2_3$ of the third lens L23 is equal to −3.17 mm, the effective focal length $f2_8$ of the eighth lens L28 is equal to 4.27 mm, the effective focal length $f2_{123}$ of the combination of the first lens L21, the second lens L22 and the third lens L23 is equal to −1.11 mm, the effective focal length $f2_{1234}$ of the combination of the first lens L21, the second lens L22, the third lens L23 and the fourth lens L24 is equal to −2.56 mm, the effective focal length $f2_{5678}$ of the combination of the fifth lens L25, the sixth lens L26, the seventh lens L27 and the eighth lens L28 is equal to 3.99 mm, the interval TTL2 from the object side surface S21 of the first lens L21 to the image plane IMA2 along the optical axis OA2 is equal to 19.0 mm, the effective diameter $D2_1$ of the first lens L21 is equal to 12.5 mm and the maximum field of view FOV2 for the lens assembly 2 is equal to 207 degrees. According to the above data, the following values can be obtained:

$f2_1/f2=-4.84$, $f2_2/f2=-4.31$, $f2_3/f2=-1.94$, $f2_{123}/f2=-0.68$, $f2_8/f2=2.62$, $f2_{1234}/f2_{5678}=-0.64$, $TTL2/D2_1=1.52$,

FOV1=207 Degrees which respectively satisfy the above conditions (7)-(12).

Figure 4A:
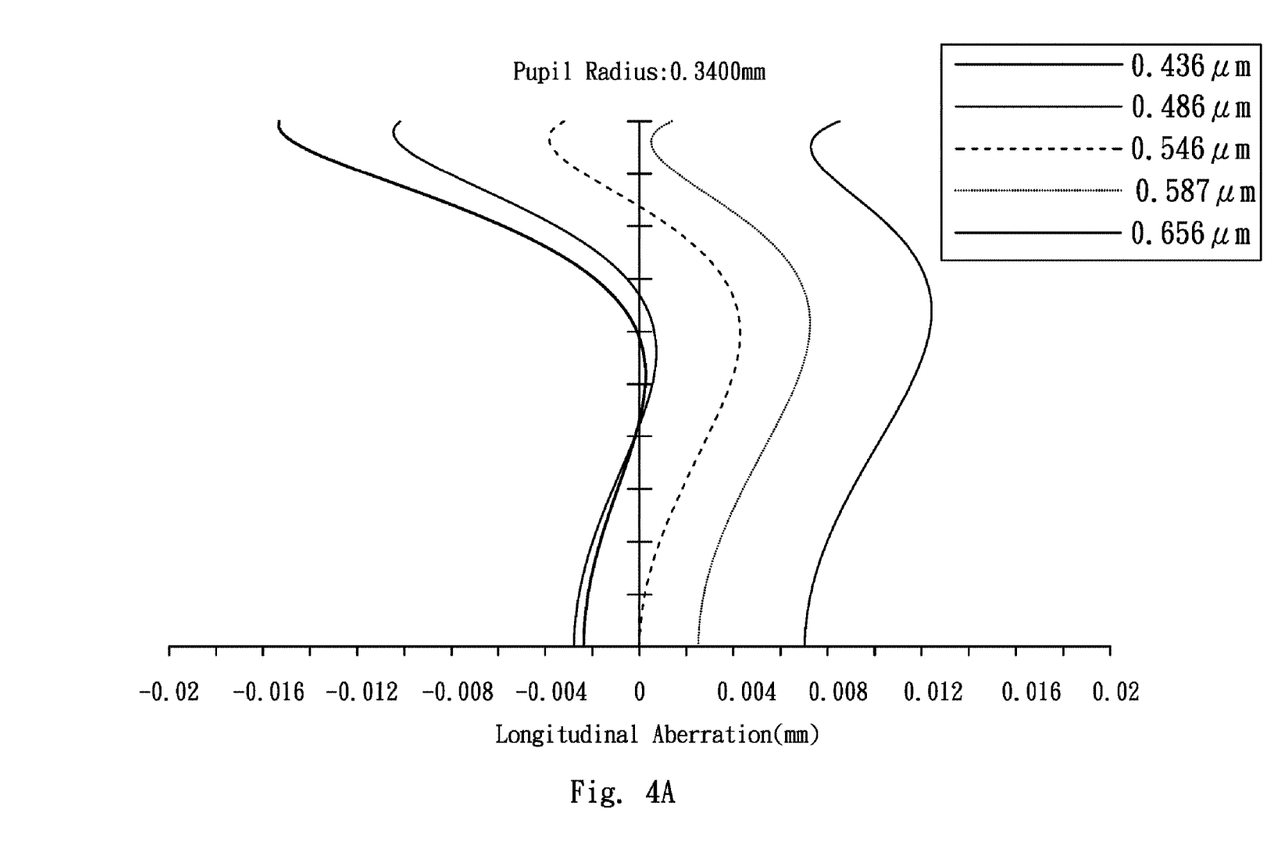
FIG. 4A depicts a longitudinal aberration diagram of the lens assembly in accordance with the second embodiment of the invention.
Figure 4B:
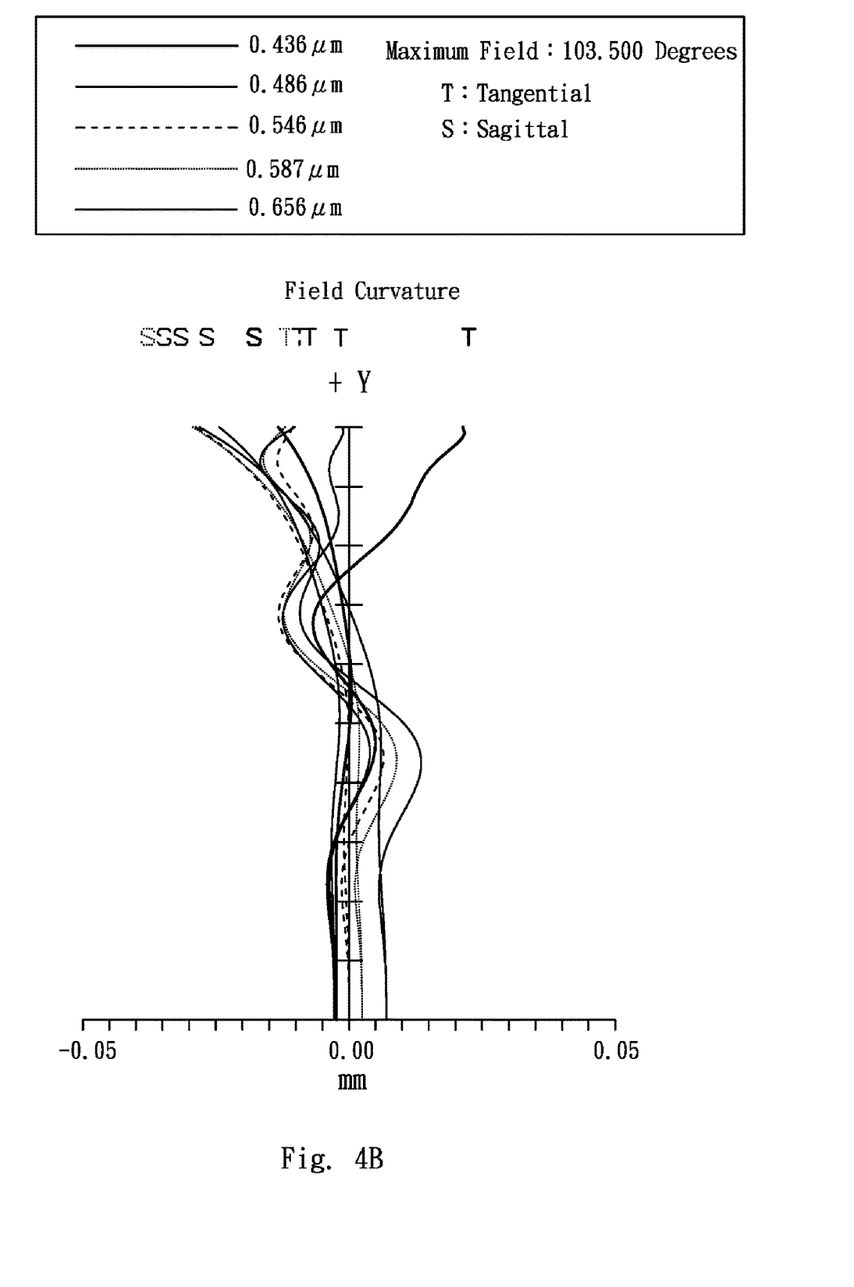
FIG. 4B is a field curvature diagram of the lens assembly in accordance with the second embodiment of the invention.
Figure 4C:
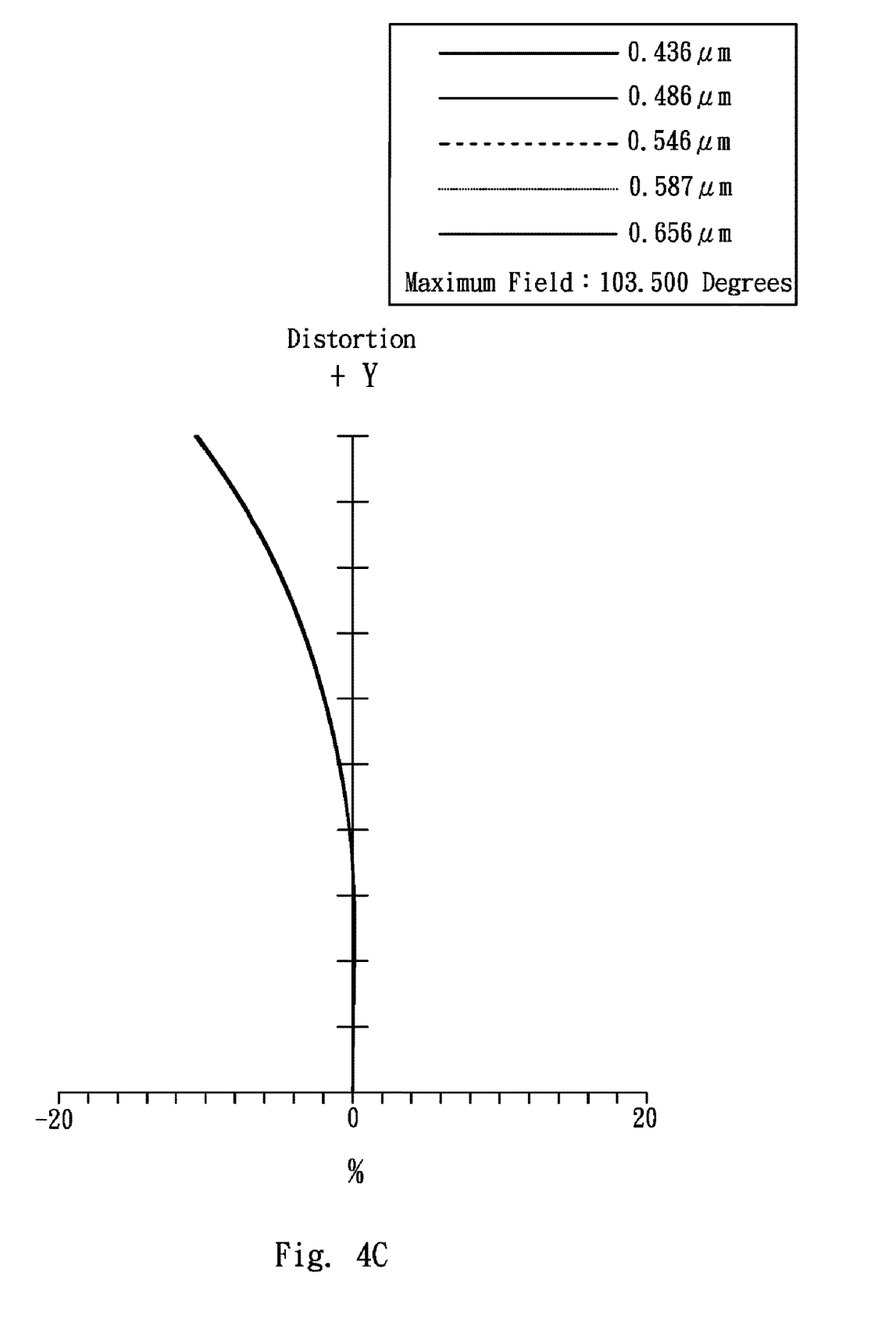
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a longitudinal aberration diagram of the lens assembly 2 in accordance with the second embodiment of the invention, FIG. 4B shows a field curvature diagram of the lens assembly 2 in accordance with the second embodiment of the invention and FIG. 4C shows a distortion diagram of the lens assembly 2 in accordance with the second embodiment of the invention.

It can be seen from FIG. 4A that the longitudinal aberration in the lens assembly 2 of the second embodiment ranges from −0.016 mm to 0.013 mm for the wavelength of 0.436 μm, 0.486 μm, 0.546 μm, 0.587 μm and 0.656 μm.

It can be seen from FIG. 4B that the field curvature of tangential direction and sagittal direction in the lens assembly 2 of the second embodiment ranges from −0.03 mm to 0.025 mm for the wavelength of 0.436 μm, 0.486 μm, 0.546 μm, 0.587 μm and 0.656 μm.

It can be seen from FIG. 4C (in which the five lines in the figure almost coincide to appear as if a signal line) that the distortion in the lens assembly 2 of the second embodiment ranges from −11% to 0% for the wavelength of 0.436 μm, 0.486 μm, 0.546 μm, 0.587 μm and 0.656 μm.

It is obvious that the longitudinal aberration, the field curvature and the distortion of the lens assembly 2 of the second embodiment can be corrected effectively. Therefore, the lens assembly 2 of the second embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising a first lens, a second lens, a third lens, a fourth lens, a stop, a fifth lens, a sixth lens, a seventh lens and an eighth lens, all of which are arranged in order from an object side to an image side along an optical axis, wherein:
   the first lens is a meniscus lens with refractive power;
   the second lens is a meniscus lens with refractive power;
   the third lens is a biconcave lens with negative refractive power;
   the fourth lens is a biconvex lens with positive refractive power;
   the fifth lens is a biconvex lens with positive refractive power;
   the sixth lens is with positive refractive power;
   the seventh lens is with negative refractive power;
   the eighth lens is with positive refractive power; and
   the sixth lens and the seventh lens are cemented together.

2. The lens assembly as claimed in claim 1, wherein the first lens is with negative refractive power, and the second lens is with negative refractive power.

3. The lens assembly as claimed in claim 2, wherein the lens assembly satisfies:

$-15<f_1/f<-1.8$, wherein $f_1$ is an effective focal length of the first lens and f is an effective focal length of the lens assembly.

4. The lens assembly as claimed in claim 3, wherein the lens assembly satisfies:

$-15<f_2/f<-1.8$, wherein $f_2$ is an effective focal length of the second lens and f is an effective focal length of the lens assembly.

5. The lens assembly as claimed in claim 4, wherein the lens assembly satisfies:

$-15<f_3/f<-1.8$, wherein $f_3$ is an effective focal length of the third lens and f is an effective focal length of the lens assembly.

6. The lens assembly as claimed in claim 2, wherein the lens assembly satisfies:

$$-0.8 < f_{123}/f < -0.6,$$

wherein $f_{123}$ is an effective focal length of a combination of the first lens, the second lens and the third lens, and f is an effective focal length of the lens assembly.

7. The lens assembly as claimed in claim 6, wherein the lens assembly satisfies:

$$2.4 < f_8/f < 2.8,$$

wherein $f_8$ is an effective focal length of the eighth lens and f is an effective focal length of the lens assembly.

8. The lens assembly as claimed in claim 7, wherein the lens assembly satisfies:

$$-0.8 < f_{1234}/f_{5678} < -0.6,$$

wherein $f_{1234}$ is an effective focal length of a combination of the first lens, the second lens, the third lens and the fourth lens, and $f_{5678}$ is an effective focal length of a combination of the fifth lens, the sixth lens, the seventh lens and the eighth lens.

9. The lens assembly as claimed in claim 2, wherein the lens assembly satisfies:

$$0.8 < TTL/D_1 < 1.6,$$

wherein TTL is an interval from an object surface of the first lens to an image plane along the optical axis and $D_1$ is an effective diameter of the first lens.

10. The lens assembly as claimed in claim 2, wherein the lens assembly satisfies:

$$200° < FOV < 240°,$$

wherein FOV is a maximum field of view in degree for the lens assembly.

11. The lens assembly as claimed in claim 2, wherein the first lens further comprises a convex surface facing the object side and a concave surface facing the image side.

12. The lens assembly as claimed in claim 2, wherein the second lens further comprises a convex surface facing the object side and a concave surface facing the image side.

13. The lens assembly as claimed in claim 2, wherein the third lens is a spherical lens.

14. The lens assembly as claimed in claim 2, wherein the second lens further comprises two surfaces, at least one of which is an aspheric surface, the third lens further comprises two surfaces, at least one of which is an aspheric surface, the fifth lens further comprises two surfaces, at least one of which is an aspheric surface, and the eighth lens further comprises two surfaces, at least one of which is an aspheric surface.

15. The lens assembly as claimed in claim 14, wherein the first lens, the second lens, the third lens, the fourth lens, the fifth lens, the sixth lens, the seventh lens and the eighth lens are made of glass material.

16. A lens assembly, comprising a first lens, a second lens, a third lens, a fourth lens, a fifth lens, a sixth lens, a seventh lens and an eighth lens, all of which are arranged in order from an object side to an image side along an optical axis, wherein:
the first lens is with negative refractive power;
the second lens is with negative refractive power;
the third lens is a biconcave lens with negative refractive power;
the fourth lens is a biconvex lens with positive refractive power;
the fifth lens is a biconvex lens with positive refractive power;
the sixth lens is with positive refractive power;
the seventh lens is with negative refractive power;
the eighth lens is with positive refractive power; and
the lens assembly satisfies: $-15 < f_1/f < f_2/f < f_3/f < -1.8$, wherein $f_1$ is an effective focal length of the first lens, $f_2$ is an effective focal length of the second lens, $f_3$ is an effective focal length of the third lens and f is an effective focal length of the lens assembly.

17. The lens assembly as claimed in claim 16, wherein the first lens further comprises a convex surface facing the object side and a concave surface facing the image side.

18. The lens assembly as claimed in claim 16, wherein the second lens further comprises a convex surface facing the object side and a concave surface facing the image side.

19. The lens assembly as claimed in claim 16, further comprising a stop disposed between the fourth lens and the fifth lens.

* * * * *